(12) United States Patent
Corma Canós et al.

(10) Patent No.: US 7,449,169 B2
(45) Date of Patent: Nov. 11, 2008

(54) MICROPOROUS CRYSTALLINE ZEOLITE MATERIAL (ZEOLITE ITQ-22), SYNTHESIS METHOD THEREOF AND USE OF SAME AS A CATALYST

(75) Inventors: Avelino Corma Canós, Valencia (ES); Fernando Rey García, Valencia (ES); Susana Valencia Valencia, Valencia (ES); Luis Joaquín Martinez Triguero, Valencia (ES)

(73) Assignees: Consejo Superior de Investigaciones Cientificas, Madrid (ES); Universidad Politecnica de Valencia, Valencia (ES)

( * ) Notice: Subject to any disclaimer, the term of this patent is extended or adjusted under 35 U.S.C. 154(b) by 795 days.

(21) Appl. No.: 10/996,182

(22) Filed: Nov. 23, 2004

(65) Prior Publication Data

US 2005/0182278 A1    Aug. 18, 2005

Related U.S. Application Data

(63) Continuation of application No. PCT/ES03/00246, filed on May 23, 2003.

(30) Foreign Application Priority Data

| May 23, 2002 | (ES) | ................................. 200201249 |
| Feb. 14, 2003 | (ES) | ................................. 200300444 |
| Apr. 30, 2003 | (ES) | ................................. 200301058 |

(51) Int. Cl.
  *C01B 39/46*   (2006.01)
  *C01B 39/48*   (2006.01)
  *B01J 29/80*   (2006.01)
  *B01J 29/70*   (2006.01)

(52) U.S. Cl. .......................... 423/718; 423/706; 502/60; 502/64; 502/65; 502/67; 502/73; 585/467; 208/109; 208/110; 208/111.01; 208/111.2; 208/118; 208/119; 208/120.01; 208/120.2; 208/134; 208/135; 208/299

(58) Field of Classification Search ................. 423/706, 423/718; 502/60, 65, 64, 67, 73; 585/467; 208/109, 110, 111.01, 111.2, 118, 119, 120.01, 208/120.2, 134, 135, 299

See application file for complete search history.

(56) References Cited

U.S. PATENT DOCUMENTS

| 6,287,124 B1* | 9/2001 | Yamaura et al. ............. 434/219 |
| 6,620,401 B1* | 9/2003 | Elomari ....................... 423/706 |

* cited by examiner

*Primary Examiner*—David M Brunsman
(74) *Attorney, Agent, or Firm*—Klauber & Jackson LLC

(57) ABSTRACT

The present invention refers to a microporous crystalline material of zeolitic nature (ITQ-22) which, in the calcined state, has the empirical formula x(M1/nXO2):yYO2:zR: wH2O
wherein
  M is H+ or at least one inorganic cation of charge +n;
  X is at least one chemical element of oxidation state +3, preferably selected from the group consisting of Al, Ga, B, Fe and Cr;
  Y is at least one chemical element with oxidation state +4 other than Si and Ge, preferably selected from the group consisting of Ti, Sn and V;
  x has a value less than 0.2, preferably less than 0.1 and can take the value zero,
  y has a value less than 0.1, preferably less than 0.05 and can take the value zero,
  z has a value less than 0.8, preferably between 0.005 and 0.5 and can take the value zero,
with a characteristic X-ray diffraction pattern, to the method of preparation and to the use of the material in separation and transformation processes of organic compounds.

40 Claims, 2 Drawing Sheets

MICROPOROUS CRYSTALLINE ZEOLITE MATERIAL (ZEOLITE ITQ-22), SYNTHESIS METHOD THEREOF AND USE OF SAME AS A CATALYST

RELATED APPLICATIONS

The present application is a Continuation of co-pending PCT Application No. PCT/ES03/00246, filed May 23, 2003, which in turn, claims priority from Spanish Application Serial Nos. P200201249, filed May 23, 2002, No. P200300444, filed Feb. 14, 2003, and No. P200301058, filed Apr. 30, 2003. Applicants claim the benefits of 35 U.S.C. §120 as to the PCT application and priority under 35 U.S.C. §119 as to said Spanish applications, and the entire disclosures of the applications are incorporated herein by reference in their entireties.

TECHNICAL FIELD OF THE INVENTION

This invention belongs to the technical field of microporous crystalline materials of zeolitic nature, useful as catalysts or components of catalysts for separation and transformation processes of organic compounds.

STATE OF THE ART PRIOR TO THE INVENTION

Zeolites are microporous crystalline materials formed from a crystal lattice of $TO_4$ tetrahedra which share all their vertices giving rise to a three-dimensional structure containing channels and/or cavities of molecular dimensions. Their composition is variable and T in general represents atoms with formal oxidation state +3 or +4, such as for example Si, Ge, Ti, Al, B, Ga, and so on. When any of the T atoms has an oxidation state less than +4, the crystal lattice formed displays negative charges which are compensated by means of the presence of organic or inorganic cations in the channels or cavities. Organic molecules and $H_2O$ can also be housed in those channels and cavities so, in a general manner, the chemical composition of the zeolites can be represented by means of the following empirical formula:

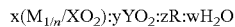

$$x(M_{1/n}/XO_2):yYO_2:zR:wH_2O$$

wherein M is one or several organic or inorganic cations of charge +n; X is one or several trivalent elements; Y is one or several tetravalent elements, generally Si; and R is one or several organic substances. Although by means of post-synthesis treatment the nature of M, X, Y and R and the values of x, y, z and w can be varied, the chemical composition of a zeolite (as synthesised or following its calcination) possesses a range characteristic of each zeolite and of its method of preparation.

The crystalline structure of each zeolite, with a specific system of channels and cavities, gives rise to a characteristic X-ray diffraction pattern, which enables them to be differentiated from each other.

Many zeolites have been synthesised in the presence of an organic molecule which acts as a structure directing agent. The organic molecules which act as structure directing agents (SDA) generally contain nitrogen in their composition and can give rise to stable organic cations in the reaction medium.

The Mobilization of precursor species during the synthesis of zeolites can be carried out in the presence of $OH^-$ groups and basic medium, which can be introduced as the hydroxide of the SDA itself, such as for example tetrapropylammonium hydroxide in the case of zeolite ZSM-5. Fluoride ions can also act as mobilising agents in the synthesis of zeolites, for example patent EP-A-337479 describes the use of HF in $H_2O$ at low pH as a mobilising agent of silica for the synthesis of zeolite ZSM-5. Nevertheless, the use of fluoride ions in the synthesis is less desirable from the industrial point of view than the use of $OH^-$, given that the presence of fluoride ions requires the use of special materials in the synthesis equipment as well as specific treatment of the waste waters and gases.

Fluid catalytic cracking (FCC), or its variant deep catalytic cracking (DCC), together with steam cracking, are the units which most contribute to the production of C3-C5 olefins. Moreover, FCC contributes approximately 30% of the gasoline stream in the refinery. The production of propylene in the FCC can be incremented by modifying the operating conditions of the unit, such as increasing the temperature of the reactor, for example. Nevertheless, this solution entails a considerable increase in gases and especially in undesired dry gas. Better results are obtained using new compositions of catalysts involving the use of zeolite mixtures. The use of zeolite ZSM-5 as additive in FCC catalysts also leads to an increase in C3 and C4 olefins (see for example U.S. Pat. Nos. 3,758,403, 3,769,202; 3,894,931; 3,894,933; 3,894,934; 3,926,782; 4,309,280; 4,309,279; and 437,458 and Buchanan, J. S. and Adewuyi, Y-G., *Applied Catalysis: A General*, 134, 247 (1996); Madon, R. J., *Journal of Catalysis* 129 (1), 275 (1991). Nevertheless, it is known (*Studies in Surface Science and Catalysis*, vol. 76, 499 (1993)) that the introduction of zeolite ZSM-5 produces a decrease in dry gas, and an increase in the proportion of aromatics in the gasoline. This is particularly important from the point of view both of producing an increase in the yield of C3-C5 olefins, and especially propylene, and of obtaining a high yield of high octane/barrel gasoline with a low aromatics content, finding other alternative zeolites to zeolite ZSM-5 which, acting as an additive of zeolite faujasite Y, would provide light olefins with minimum loss of gasoline. Numerous zeolites have been studied in this direction such as zeolite MCM-22, Omega, L, mordenite BEA and ITQ-7 (see for example: *J. Catal.* 165, 102 (1997); *Stud. Surf. Sci. and Catal.* 46, 115 (1989); the patents: U.S. Pat. No. 5,314,612; EP-489324; U.S. Pat. Nos. 474,292; 4,137,152; EP-350331; FR-2661621; WO-0170905).

Nevertheless, the need persists to improve known procedures by means of using new catalysts with better performance in cracking.

With regard to the use of zeolites as catalysts in alkylation processes of aromatics, cumene is of particular interest as a raw material for the production of phenol and acetone. Numerous works have been developed using acid catalysts. A general reference on catalysts and processes used can be found in: "Encyclopedia of Chemical Processing and Design", J. J. McKezta and W. A. Cunningham Editors, V. 14, pp. 33-55 (1982). The alkylation process of benzene with propylene, as well as seeking a high conversion of propylene and a high selectivity to the monoalkylated product isopropylbenzene (cumene), also requires minimising the quantity of n-propyl benzene (NPB) formed. Given that it is difficult to separate cumene and NPB by conventional methods, such as by distillation, it can be understood that the yield of NPB has to be as low as possible and in all cases very low, during the alkylation of benzene with propylene.

Zeolites have been used as catalysts for the alkylation of aromatics and so, for example, patent U.S. Pat. No. 429,457 describes zeolite ZSM-5 as a catalyst for alkylation of benzene with propylene.

Nevertheless, due probably to the small diameter of its channels, this zeolite displays low selectivity for the desired process. There also exist numerous patents which describe the use of Faujasite and modified Faujasites as catalysts for the production of cumene by alkylation of benzene with propylene. Zeolite Y can be used as a catalyst but it is necessary to work with high benzene/propylene ratios in the feed. This leads to high costs in the recycling of benzene. Zeolite Beta has also been claimed as a catalyst for alkylation of benzene with propylene in various patents such as for example: U.S. Pat. Nos. 4,891,458, 5,030,786, EP-432814, EP-439632; EP-629599. This zeolite produces good results in activity and selectivity, but its behaviour could be better both with regard to selectivity towards NPB and as far as the stability of the catalyst is concerned. The use of a new zeolite (MCM-22) has recently been claimed.

The object of the present invention is to provide a material of a nature that can advantageously be applied in processes of separation and transformation of organic compounds, and more particularly its use as an active zeolitic compound for the cracking of organic compounds and more specifically hydrocarbon fractions derived from natural or synthetic petroleums, as well as in the alkylation process of aromatics.

The pore topology of this new zeolite confers on it properties for acting as an additive of zeolite faujasite Y in catalysts for fluid catalytic cracking (FCC) units, providing high yields of light olefins with a high octane-barrel number of the gasoline produced, as well as reduction in the content of aromatics in the gasoline in comparison with the base catalyst.

DESCRIPTION OF THE INVENTION

The present invention achieves the objectives defined above by means of a microporous crystalline material of zeolitic nature, also identified as "ITQ-22" or "zeolite ITQ-22", its method of preparation in the absence of fluoride ions and its applications. This material, in both its calcined form and synthesised uncalcined, has an X-ray diffraction pattern that is different from that of other known zeolitic materials and which is therefore characteristic of this material.

The X-ray diffraction pattern of the material ITQ-22, as synthesised, has been obtained by the powder method employing a fixed divergence slit and using $K_\alpha$ radiation from Cu. This pattern is characterised by the values of angle $2\theta$ (degrees) and relative intensities ($I/I_0$) of the most intense reflections which are shown in Table I, with $I_0$ being the intensity of the most intense peak which is assigned a value of 100. The relative intensities have been expressed in the following terms: m=medium intensity (between 20 and 40%); s=strong intensity (between 40 and 60%) and vs=very strong intensity (between 60 and 100%).

TABLE I

| $2\theta$ (degrees) ± 0.5 | Intensity ($I/I_0$) |
| --- | --- |
| 8.02 | vs |
| 8.43 | vs |
| 9.31 | m |
| 10.64 | vs |
| 20.26 | m |
| 21.81 | s |
| 22.53 | vs |

Once calcined and in the anhydrous state, the material accords with the general formula $$x(M_{1/n}XO_2):yYO_2:zGeO_2:(1-z)SiO_2$$

wherein "x" possesses a value less than 0.2, preferably less than 0.1 and can take the value zero; "y" has a value less than 0.1, preferably less than 0.05 and can take the value zero; "z" possesses a value less than 0.8, preferably between 0.005 and 0.5 and can take the value zero; M is one or several inorganic cations of charge +n; X is one or several chemical elements of oxidation state +3 (Al, Ga, B, Fe, Cr) and Y is one or several chemical elements with oxidation state +4 other than Si and Ge (Ti, Sn, V).

Nevertheless, depending on the synthesis method and on the calcination or later treatments, it is possible for defects to exist in the crystal lattice, which are manifested by the presence of Si—OH (silanol) groups. These defects have not been included in the above empirical formula.

Table II shows the values of angle $2\theta$ (degrees) and relative intensities ($I/I_0$) of the most intense reflections of the powder X-ray diffractogram zeolite ITQ-22 after being calcined in order to eliminate organic compounds occluded in its interior, where m, s, and vs have the same meanings as in Table I.

TABLE II

| $2\theta$ (degrees) ± 0.5 | Intensity ($I/I_0$) |
| --- | --- |
| 6.97 | m |
| 8.00 | vs |
| 8.40 | vs |
| 9.28 | m |
| 10.62 | vs |
| 20.18 | m |
| 21.74 | m |
| 22.54 | vs |

The positions, widths and relative intensities of the peaks depends to a certain degree on the chemical composition of the material, as well as on the degree of hydration and crystal size. In particular, when the lattice is composed solely of silicon and germanium oxides, with a ratio Si/Ge=3.8 and it has been synthesised using the quaternary ammonium cation 1,5-bis(methylpyrrolidinium) pentane as structure directing agent, the material as synthesised displays an X-ray diffraction pattern like that shown in FIG. I. This diagram is characterised by the values of angle $2\theta$ (degrees) and relative intensities ($I/I_0$) that are shown in Table III. The relative intensities have been expressed in the following terms: w=weak intensity (between 0 and 20%); m=medium intensity (between 20 and 40%); s=strong intensity (between 40 and 60%) and vs=very strong intensity (between 60 and 100%).

TABLE III

| $2\theta$ (degrees) ± 0.5 | Intensity ($I/I_0$) |
| --- | --- |
| 6.96 | w |
| 7.12 | w |
| 8.02 | vs |
| 8.43 | vs |
| 9.31 | m |
| 10.64 | vs |
| 10.95 | w |
| 13.83 | w |
| 16.11 | w |
| 16.31 | w |
| 18.68 | w |
| 19.58 | w |
| 19.95 | w |
| 20.11 | m |
| 20.26 | m |
| 20.68 | w |
| 21.54 | w |
| 21.81 | s |

TABLE III-continued

| 2θ (degrees) ± 0.5 | Intensity (I/I₀) |
|---|---|
| 22.27 | w |
| 22.53 | vs |
| 22.70 | m |
| 22.91 | w |
| 23.03 | w |
| 23.18 | w |
| 24.22 | w |
| 24.33 | w |
| 25.30 | w |
| 26.44 | w |
| 27.65 | w |
| 28.14 | w |
| 28.52 | w |
| 29.03 | w |
| 29.69 | w |
| 29.90 | w |
| 32.28 | w |
| 33.26 | w |
| 35.98 | w |

The X-ray diffraction pattern of the above sample of ITQ-22, after being calcined at 580° C. in order to eliminate organic compounds occluded in its interior, is shown in FIG. 2. This diffractogram is characterised by the values of angle 2θ (degrees) and relative intensities (I/I₀) that are shown in Table IV, where w, m, s and vs have the same meanings as in Table III. The comparison of the X-ray diffractograms corresponding to zeolite ITQ-22 as synthesised and in the calcined state demonstrate the thermal stability of the material.

TABLE IV

| 2θ (degrees) ± 0.5 | Intensity (I/I₀) |
|---|---|
| 6.97 | m |
| 7.12 | w |
| 8.00 | vs |
| 8.40 | vs |
| 9.28 | m |
| 9.97 | w |
| 10.62 | vs |
| 10.92 | w |
| 11.62 | w |
| 13.81 | w |
| 15.04 | w |
| 16.04 | w |
| 16.14 | w |
| 16.26 | w |
| 18.63 | w |
| 19.52 | w |
| 20.18 | m |
| 20.63 | w |
| 21.48 | w |
| 21.74 | m |
| 22.21 | w |
| 22.54 | vs |
| 23.04 | w |
| 24.17 | w |
| 25.23 | w |
| 26.33 | w |
| 27.58 | w |
| 28.02 | w |
| 28.22 | w |
| 28.42 | w |
| 28.92 | w |
| 29.62 | w |
| 32.24 | w |

The present invention also refers to the preparation method of ITQ-22. This is carried out in basic medium, in the absence of fluoride ions and comprises heat treatment at a temperature between 80 and 200° C., preferably between 130 and 200° C., of a reaction mixture containing a source of $SiO_2$ (such as for example tetraethylorthosilicate, colloidal silica, amorphous silica), optionally a source of $GeO_2$, one or various organic cations, among which can be 1,5-bis(methylpyrrolidinium) pentane, and water. The organic cations are added to the reaction mixture in the form of salt (for example, a halide, preferably, chloride or bromide) or hydroxide, and in addition a source of alkaline or alkaline earth ions in the form of hydroxide or in salt form can also be added.

Optionally, it is possible to add a source of tetravalent element or elements Y other than Si and Ge, preferably Ti, V, Sn and/or trivalent elements X, preferably Al, B, Ga, Fe, Cr The addition of this element or elements can be done prior to heating of the reaction mixture or in an intermediate moment during that heating. It can occasionally be convenient to also add crystals of ITQ-22 (between 0.01 and 20% by weight with respect to the inorganic oxides taken as a whole, preferably between 0.05 and 10% by weight) as promoters of the crystallisation (sowing) at some stage of the preparation. The composition of the reaction mixture accords with the general empirical formula:

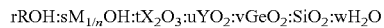

$rROH:sM_{1/n}OH:tX_2O_3:uYO_2:vGeO_2:SiO_2:wH_2O$ wherein M is one or several inorganic cations of charge +n; X is one or several trivalent elements, preferably Al, B, Ga, Fe, Cr; Y is one or several tetravalent elements other than Si and Ge, preferably Ti, Sn, V; R is an organic cation, preferably 1,5-bis(methylpyrrolidinium)pentane; and the values of r, s, t, u, v and w vary in the ranges r=$ROH/SiO_2$=0.01-1.0, preferably 0.1-1.0
s=$M_{1/n}OH/SiO_2$=0-1.0, preferably 0-0.2
t=$X_2O_3/SiO_2$=0-0.1, preferably 0-0.05
u=$YO_2/SiO_2$=0-0.1, preferably 0-0.05
v=$GeO_2/SiO_2$=0-4, preferably 0.005-1
w=$H_2O/SiO_2$=1-100, preferably 1-50

The heat treatment of the reaction mixture can be done statically or with stirring of the mixture. Once the crystallisation is complete, the solid product is separated by filtration or centrifugation and dried. The later calcination at temperatures above 350° C., preferably between 400 and 900° C., produces the decomposition of organic remains occluded in the interior of the zeolite and their exit, leaving the zeolitic channels free. The calcination can be done in the presence of $N_2$ followed by calcination in air, or direct calcination in air can be carried out, or an extraction of the organic matter with mineral or organic acids can be performed, or the organic material can be eliminated by treatment with ozone.

After having been calcined, the material is pelletised. The means by which the catalyst is pelletised are well known in the literature, using a diluent such as for example $SiO_2$ or $Al_2O_3$ or a clay, zirconium, magnesium oxide or mixture thereof, in proportions of zeolite/diluent of between 20 and 95%, preferably between 40 and 90% by weight.

In an alternative embodiment, the calcined catalyst can be treated with an aqueous solution of a mineral acid such as for example $HNO_3$, $H_2SO_4$, $H_3PO_4$, $HClO_4$.

By means of treatment of that aqueous solution of mineral acid, a pH of between 0 and 1.5 is reached, at temperatures between 20 and 100° C. in a time period between 10 and 400 minutes, depending on the concentrations of acid and the treatment temperature. The ratio of catalyst to aqueous solution of acid lies between 0.05 and 1, and preferably between 0.1 and 0.5 by weight.

The resulting material, whether or not treated with acid, but containing acid centres in its structure, once it has been calcined at a temperature between 450 and 700° C., is used as a catalyst.

The ITQ-22 material can be used in the following applications:

As an additive of catalytic cracking catalysts for hydrocarbons, and for organic compounds in general.

As a component of hydrocracking and gentle hydrocracking catalysts.

As a component or additive of isomerisation catalysts for light paraffins.

As a component of deparaffining and isodeparaffining catalysts.

As an alkylation catalyst of isoparaffins with olefins and alkylation of aromatics and aromatics substituted with olefins, alcohols or polyalkylated aromatics, and more specifically as a catalyst for the alkylation of benzene with propylene.

As a catalyst in acylation reactions, preferably in acylation reactions of substituted aromatic compounds using acids, acid chlorides or anhydrides of organic acids as acylating agents.

As catalysts in oxidation reactions, preferably of the Meerwein-Pondorf-Verley type.

An especially preferred use is as an additive of catalytic cracking catalysts for hydrocarbons, and for organic compounds in general. Zeolite ITQ-22 has a three-dimensional topology with a system of pores and dimensions different from any other zeolite used so far in FCC catalysts. This zeolite contains pores formed by of 8, 10 and 12 membered rings connected, and it is precisely this topology which gives rise to a specific behaviour in cracking catalysts.

In its use as a cracking catalyst, the zeolitic material ITQ-22 can be the only zeolitic component of the catalyst embedded in a matrix, or it can be accompanied by at least one second zeolitic component, both embedded in a matrix.

When ITQ-22 is accompanied by another zeolitic component or components, said second zeolitic component can be formed of zeolitic structures selected among zeolitic structures containing pores delimited by rings of 14 members, such as for example SSZ-24, CIT-5, UTD-1; zeolitic structures containing pores delimited by rings of 12 members, such as for example zeolite Beta, ITQ-7, zeolite faujasite Y, SSZ-33; zeolitic structures containing pores delimited by rings of 11 members, such as for example NU-86; zeolitic structures containing pores delimited by rings of 10 members, such as for example ITQ-13, ZSM-5, SAPO-11, MCM-22, and mixtures thereof.

Moreover, for the cracking process the catalyst can consist partially or wholly of a single type of particle with the material ITQ-22 and the said at least second component being present in the catalyst in the same particle, embedded in a matrix. Said particle preferably comprises at least two zeolitic components which are ITQ-22 and zeolite faujasite Y in one or more of its variants selected from the group formed from zeolite faujasite Y, ultrastable zeolite faujasite Y, zeolite faujasite Y fully exchanged with rare earths, zeolite faujasite Y partially exchanged with rare earths, ultrastable zeolite faujasite Y fully exchanged with rare earths, ultrastable zeolite faujasite Y partially exchanged with rare earths and mixtures thereof. Preferably, said second zeolitic component of the type faujasite Y is present in quantities between 0.1 and 99.9% by weight with respect to the total weight of zeolitic components, with the weight of zeolite ITQ-22 being between 0.1 and 60% by weight with respect to the total weight of zeolitic components. The rest of the catalyst composition is formed by the matrix containing components well known in the art, such as kaolin, alumina and silica, being able to also contain $P_2O_5$.

When zeolite ITQ-22 is used in cracking together with at least one other zeolitic component and wherein the zeolitic components are embedded in the same particle, at least some of the particles of the catalytic cracking catalyst preferably comprise:

0.1-40% by weight of the zeolitic material ITQ-22 with respect to the total weight of zeolitic components 0.1-99.9% by weight of the zeolite faujasite Y with respect to the total weight of zeolitic components.

In its use in cracking processes, zeolite ITQ-22 can form part of a catalyst partially or wholly constructed of at least two types of particle in which the zeolitic material ITQ-22 and said at least one second zeolitic material are embedded in a matrix, the zeolitic material ITQ-22 and said second zeolitic component being present in different particles, the catalyst being a physical mixture of particles of different nature. So, in this case, each zeolite would be incorporated separately into a matrix. The final mixture of the catalyst would be formed by a mixture of at least two types of particle, with each type of particle incorporating a different zeolitic component. The final mixture would preferably be formed by a type of particle that includes ITQ-22 in a matrix, and by a second type of particle that includes zeolite faujasite Y in any of the different forms of faujasite Y, embedded in a second matrix. An FCC catalyst would be formed by this type of said mixture of particles; particles with ITQ-22 and particles with zeolite faujasite Y in any of its two forms.

When zeolite ITQ-22 is used in a cracking process with another zeolitic component or components, with the zeolitic components being embedded in different types of particle, the catalytic cracking catalyst preferably comprises:

0.1-40% by weight of particles containing zeolite ITQ-22 with respect to the sum of zeolitic components, in which each particle comprises 10-70% by weight of zeolite ITQ-22;

0.1-99.9% by weight of particles containing a conventional catalytic cracking catalyst based on faujasite type zeolite, in which the percentages are indicated on the sum of zeolitic components.

In the case that the catalyst for use in cracking comprises ITQ-22 and another zeolitic component or components, contained in particles of different type, said catalyst can have a composition in which there exists at least a third type of particle, in which a third zeolite would be included in a matrix. This third zeolite is preferably ZSM-5.

Of course, and as is known in the art, a final catalyst could also contain other particles with the aim of, for example, and without being limiting, improving fluidisation, trapping contaminants (such as for example metals, nitrogen, $Na^+$), converting beds, trapping SOx. In particular, an FCC catalyst could contain these types of additional particles mentioned.

In the catalytic cracking catalyst described which contains ITQ-22, zeolite faujasite Y and ZSM-5, a physical mixture of separate particles is preferred in which the zeolitic components are to be found in the following proportions: Zeolite faujasite Y at no less than 20% by weight with respect to the total weight of zeolitic components; zeolite ITQ-22+ZSM-5 at a maximum of 80% by weight, the ratio by weight between zeolite ZSM-5 and zeolite ITQ-22 lying between 10 and 0.

When the catalyst contains zeolite ITQ-22 and at least two other zeolitic components, contained in particles of different type, the third component is preferably zeolite ZSM-5.

For its use in cracking, the catalyst can comprise more than three types of different particles, in particular FCC catalysts which can also contain other particles for improving fluidisation, etc.

The catalyst particles include components that are not active in the catalytic process though they are necessary in order to conform them, such as binders and/or conventional additives such as clays, among others.

The zeolitic components can include one or more $T^{IV}$ elements, such as for example Si and also other $T^{III}$ element or elements, preferably selected from the group made up of Al, Fe, Ge, Ga, Zn, Ti, B and mixtures thereof. It can also include phosphorus. Likewise, they can be exchanged with divalent and/or trivalent ions or with rare earths. Also optionally, they can contain compounds of vanadium, and optionally cerium, added in a stage subsequent to the synthesis of the zeolite.

Both when the zeolitic components are to be found in the same particle and when the zeolitic components are to be found in separate particles, zeolite faujasite Y can be added to the cracking catalyst in various forms, such as zeolite HY, ultrastable zeolite faujasite Y (USY), zeolite faujasite Y totally exchanged with rare earths (REY) or with rare earths and H⁺ (HREY), zeolite USY partially exchanged with rare earths (REUSY), or zeolite type Y exchanged with rare earths and calcined (CREY).

When a catalytic cracking catalyst comprises ITQ-22 with at least two other zeolitic components in separate particles, each type of catalyst particle can comprise one or more or the zeolitic components.

Both in the case of the catalyst containing ITQ-22 as the sole zeolitic component and in the case of its containing another zeolitic component or components, in order to form the catalyst particles a matrix is used containing at least one binder such as silica, alumina, silica-alumina, $P_2O_5$ and mixtures thereof. The final particles of catalyst can also contain conventional additives for catalytic cracking such as clays.

In particular, in FCC catalysts, the catalyst can contain any conventional material, such as for example kaolin, in order to conform catalysts with various sizes of particle. When an FCC catalyst is prepared, a suspension can be made and atomised in order to form the particles of the catalyst. In the case of FCC units, particles of between 60 and 200 micrometers are preferred.

The different zeolitic components of the zeolitic material ITQ-22 which form part of a catalyst for use in cracking can include one or more $T^{IV}$ elements, such as for example Si and Ge and also include at least one $T^{III}$ element. Said $T^{III}$ element is preferably selected from the group made up of Al, Fe, Ge, Ga, Zn, Ti, B and mixtures thereof.

In the case of catalytic cracking in FCC units, zeolite ITQ-22 can be modified by means of the addition of phosphorus. In its initial composition, the molar ratio between $T^{IV}$ and $T^{III}$ lies between 8 and 10000 and preferably between 20 and 1000. The cracking catalyst can also contain one or more alkaline metals. In no case may the quantity of alkaline metal, if there is any, exceed 0.25% by weight of $Na_2O$.

The zeolitic components that can form part of the cracking catalyst, including the zeolitic material ITQ-22, as has been stated earlier, can contain phosphorus. The quantity of phosphorus present preferably lies between 0 and 8% by weight with respect to zeolite ITQ-22. The phosphorus can be incorporated by impregnation in a, for example aqueous, solution of at least one acid or salt chosen from the group consisting of $H_3PO_4$, $(NH_4)_3PO_4$, $(NH_4)_2HPO_4$, $(NH_4)H_2PO_4$. The product obtained is calcined at a temperature between 350 and 700° C.

The zeolitic components that can form part of the cracking catalyst, including the zeolitic material ITQ-22, can be exchanged with divalent and/or trivalent ions or they can be exchanged wholly or partially with rare earths. For use in cracking, the catalyst can contain compounds of vanadium and optionally cerium added in a stage subsequent to the synthesis of zeolite ITQ-22.

For use in cracking the catalyst particles can have a size between 20 and 400 micrometers. In a preferred embodiment the catalyst is formed from particles with a size between 60 and 200 micrometers.

The zeolite ITQ-22 can be used in an FCC cracking process and in deep catalytic cracking (DCC), a process which consists of placing the feed in contact with the catalyst in a reactor for a length of time between 0.1 and 80 s and recovering the resulting product.

By means of using zeolite ITQ-22, gasoline is obtained with a lower content of aromatics, with a higher content of olefins and isoparaffins, less dry gas, higher octane-barrel number and a greater propylene/propane ratio than when a catalyst that does not contain ITQ-22 is used.

An especially preferred additional use for zeolite ITQ-22 is as a catalyst in an alkylation reaction. In said alkylation reaction, a suitable quantity of the catalyst is used along with an alkylating agent selected among olefins, alcohols, polyalkylated aromatic compounds and mixtures thereof in the alkylation of aromatic compounds.

Said alkylation reaction is preferably conducted with a molar ratio of alkylating agent to starting aromatic compound of between 2 and 20, in the presence of the catalyst.

When the alkylating agent is selected among an olefin, alcohol and mixtures thereof, said olefin and said alcohol preferably contain from between 2 to 20 carbon atoms.

In a preferred manner, the starting aromatic compound is selected among a group formed of benzene, naphthalene, anthracene, phenanthrene and substituted derivatives thereof, and still more preferably, the starting aromatic compound is benzene.

The starting aromatic compound can also be selected among alkylbenezene, alkylanthracene, alkylphenanthrene, hydroxybenzene, hydroxynaphthalene, hydroxyanthracene, hydroxyphenanthrene, alcoxybenzene, alcoxynaphthalene, alcoxyanthracene and alcoxyphenanthrene.

The alkylating agent is preferably a polyalkylated aromatic compound and the starting aromatic compound is a non-alkylated aromatic compound, so that during the alkylation at least one alkyl group is transferred from the polyalkylated aromatic compound to the starting aromatic compound.

When the alkylating agent is a polyalkylated aromatic compound, the alkyl group or the alkyl groups of said polylalkylating agent can contain a variable number of carbon atoms. In a preferred way, said alkyl group or groups can contain from 2 up to 20 carbon atoms, preferably from 6 to 20 carbons atoms.

When the alkylating agent is a polyalkylated aromatic compound and the starting aromatic compound is a non-alkylated aromatic compound, said starting aromatic compound is preferably selected among benzene, naphthalene, anthracene, phenanthrene, substituted benzene, substituted naphthalene, substituted anthracene and substituted phenanthrene.

The alkylating agent is preferably a polyalkylated aromatic agent and the starting aromatic compound is benzene. Still more preferably, said polyalkylated aromatic compound is polyisopropylbenzene and the starting aromatic compound is benzene, so that the alkylation of benzene with propylene produces cumene.

A preferred use of ITQ-22 therefore refers to the alkylation of benzene with an alkylating agent selected among propylene, ethylene, ethyl alcohol, propyl alcohol and mixtures thereof.

According to the use of zeolite ITQ-22 in alkylation, the alkylation reaction is conducted at a reaction temperature of between 60 and 350° C., and preferably between 80 and 300° C.

The alkylation reaction is conducted at sufficient pressure for maintaining a liquid phase, at least partially, preferably in a range between 1.4 and 7.0 MPa, and more preferably between 1.4 and 4.1 MPa.

In the alkylation reaction, the spatial velocity (WHSV) of reagents lies between 0.2 and 150 hours$^{-1}$ and preferably between 0.5 and 10 hours$^{-1}$.

The alkylation reaction of benzene with propylene is preferably conducted under the following conditions: reaction temperature lying between 60 and 350° C., and preferably between 80 and 300° C.; the pressure at which it is carried out is also sufficient for maintaining a liquid phase, at least partially, preferably being in a range between 1.4 and 7.0 MPa, and more preferably between 1.4 and 4.1 MPa; the spatial velocity (WHSV) of reagents lies between 0.2 and 150 hours$^{-1}$ and preferably between 0.5 and 10 hours$^{-1}$ and the benzene/propylene molar ratio is between 2 and 20, and preferably 2 and 15.

When ITQ-22 is applied in its acid form in the alkylation of aromatics with olefins or alcohols, and more specifically when it is used as a catalyst in the alkylation of benzene with propylene it turns out to be a highly active catalyst, and with a surprisingly low selectivity for the production of NPB. Moreover, the selectivity to cumene can be increased by introducing suitable quantities of alkaline or alkaline earth metals or metallic cations by means of ion exchange in the material. Its selectivity can also be increased by eliminating surface acidity by means of extraction of trivalent cations from the lattice, such as for example Al and/or B, by means of treatment with mineral acids or other chemical agents capable of extracting those elements. The cationic exchange treatments or leaching stated above permit a reduction in the formation of polyalkylated products.

When the ITQ-22 material contains Ti, it is especially useful as a catalyst in epoxidation reactions of olefins, oxidation of alkanes, oxidation of alcohols and oxidation of thioethers to sulphoxides and sulphones using organic or inorganic hydroperoxides, such as for example $H_2O_2$, tertbutylhydroperoxide, cumene hydroperoxide, as oxidising agents, in the amoximation of ketones, and more specifically of cyclohexanone to cyclohexanone oxime with $NH_3$ and $H_2O_2$. When the ITQ-22 material contains Sn it is particularly useful as a catalyst in Baeyer-Villiger oxidation reactions in which $H_2O_2$ is used as an oxidising agent.

EXAMPLES

Example 1

This example illustrates the preparation of the dihydroxide of 1,5-bis(methylpyrrolidinium)pentane. In a 500 ml flask, 18.7 g of 1,5-dibromopentane, 20 g of 1-methylpyrrolidine and 300 ml of acetone are mixed. The mixture is left to reflux for 24 hours, after which the precipitated solid is separated by decantation and then washed several times with acetone. Finally it is vacuum dried and 31.9 g of a white solid are obtained. The analysis of elements and the nuclear magnetic resonance spectrum in $D_2O$ of this solid indicate that it is the desired product, namely, 1,5-bis(methylpyrrolidinium)pentane dibromide. The dihydroxide form of the structure directing agent is obtained by means of anion exchange using a Dowex SBR resin (in molar excess). The exchange is carried out with stirring of the fluid bed of resin in hydroxide form and an aqueous solution of the bromide of the cation for one night. The solution obtained is titrated with HCl (aq.) using phenolphthalein as indicator, with an exchange efficiency of 95% being obtained. This solution can be concentrated in the rotary evaporator for use in the synthesis of molecular sieves, for example at a concentration of 0.5-1 N.

Example 2

This example illustrates the preparation of ITQ-22 by means of using the cation 1,5-bis(methylpyrrolidinium) pentane.

6.17 g of tetraethylorthosilicate (TEOS) are added to 23.14 g of a solution of 1,5-bis(methylpyrrolidinium) pentane dihydroxide ($R(OH)_2$) containing 0.96 equivalents of hydroxide in 1000 g. In this mixture 1.55 g of germanium oxide are added, and it is left to evaporate with stirring until complete elimination of the ethanol deriving from the hydrolysis of the TEOS plus the necessary quantity of water so that the final composition of the gel is:

0.67 $SiO_2$:0.33 $GeO_2$:0.25 $R(OH)_2$:3.5 $H_2O$

Figure 1:
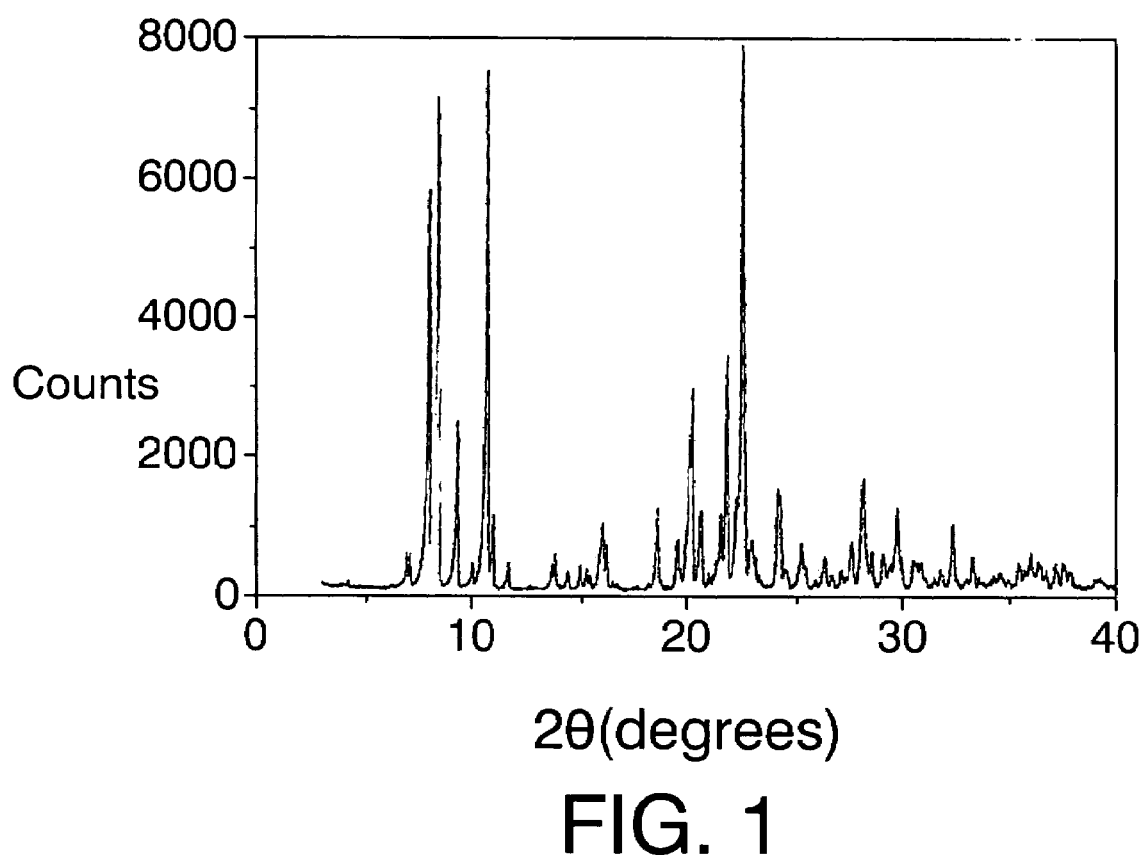
FIG. 1 represents the X-ray diffraction pattern of a sample of ITQ-22 as synthesised, in which the lattice consists solely of silicon and germanium oxides, with a ratio Si/Ge=3.8 and which has been synthesised using the quaternary ammonium cation 1,5-bis(methylpyrrolidinium) pentane as structure directing agent.
Figure 2:
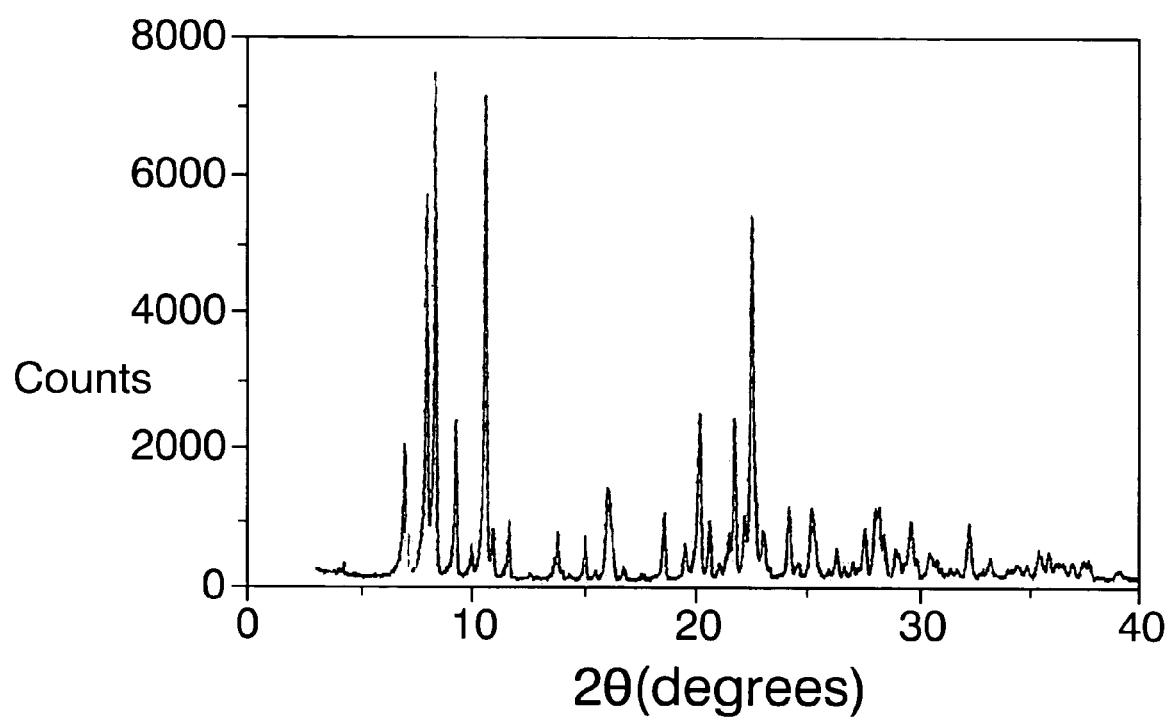
FIG. 2 shows the X-ray diffraction pattern of the same sample of ITQ-22 after being calcined at 580° C. in order to eliminate organic compounds occluded in its interior.

The mixture obtained is introduced into an autoclave internally lined with polytetrafluoroethylene and is heated at 175° C. for 14 days. The autoclave is then cooled, the contents are filtered, the solid is washed with water and dried at 100° C. The X-ray diffraction pattern is shown in FIG. I and the list of the most characteristic peaks appears in Table III. Calcination at 580° C. in air for 3 days permits occluded organic species to be eliminated. The X-ray diffraction pattern of the calcined zeolite ITQ-22 is shown in FIG. 2 and the list of most characteristic peaks appears in Table IV and indicates that the material is stable during this process.

Example 3

The following example illustrates the preparation of ITQ-22 of different composition.

12 g of tetraethylorthosilicate (TEOS) are added to 27.3 g of a solution of 1,5-bis(methylpyrrolidinium) pentane dihydroxide ($R(OH)_2$) containing 1.16 equivalents of hydroxide in 1000 g. In this mixture 0.6 g of germanium oxide are dissolved, and it is left to evaporate with stirring until complete elimination of the ethanol formed plus the excess of water so that the final composition is as follows:

0.91 $SiO_2$:0.09 $GeO_2$:0.25 $R(OH)_2$:3.5 $H_2O$

The mixture obtained is heated in autoclaves internally lined with polytetrafluoroethylene at 175° C. for 14 days. The solid obtained after filtering, washing with distilled water and drying at 100° C. is ITQ-22.

Example 4

This example illustrates synthesis of Al-ITQ-22.

0.097 g of Al isopropoxide are added to 9 g of tetraethylorthosilicate (TEOS). After that, 20.68 g of a solution of 1,5-bis(methylpyrrolidinium)pentane dihydroxide $(R(OH)_2)$ containing 1.16 equivalents of hydroxide in 1000 g are added, and then 0.45 g of germanium oxide are dissolved. The mixture is left to evaporate with stirring until complete elimination of the ethanol deriving from the hydrolysis of the TEOS plus the necessary quantity of water in order to achieve the stated final composition. The composition of the gel is: 0.91 $SiO_2$:0.09 $GeO_2$:0.005 $Al_2O_3$:0.25 $R(OH)_2$:3.5$H_2O$.

The mixture obtained is introduced into an autoclave internally lined with polytetrafluoroethylene and is heated to 175° C. for 12 days.

The X-ray diffraction pattern of the solid obtained after filtering, washing with distilled water and drying at 100° C. indicates that it is ITQ-22.

Example 5

This example illustrates the preparation of a sample of Al-ITQ-22 with a chemical composition different from that of the above example.

0.325 g of Al isopropoxide are added to 11.05 g of tetraethylorthosilicate (TEOS). After that, 34.2 g of a solution of 1,5-bis(methylpyrrolidinium)pentane dihydroxide $(R(OH)_2)$ containing 1.2 equivalents of hydroxide in 1000 g are added, and then 2.77 g of germanium oxide are dissolved. The mixture is left to evaporate with stirring until complete elimination of the ethanol deriving from the hydrolysis of the TEOS plus the necessary quantity of water in order to achieve the stated final composition. The composition of the gel is: 0.67 $SiO_2$:0.33 $GeO_2$:0.01 $Al_2O_3$:0.25 $R(OH)_2$:15$H_2O$.

The mixture obtained is introduced into autoclaves internally lined with polytetrafluoroethylene and is heated to 175° C. for 12 days.

The X-ray diffraction pattern of the solid obtained after filtering, washing with distilled water and drying at 100° C. indicates that it is ITQ-22. The solid obtained is calcined at 580° C. for 3 hours and the X-ray diffraction pattern shows that the structure is maintained. The chemical analysis of the calcined zeolite indicates that it has a composition that accords with the molar ratios Si/Ge=5 and (Si+Ge)/Al=30.

Example 6

This example illustrates the synthesis of Ti-ITQ-22.

0.3 g of Ti (IV) tetraethoxide are added to 9.26 g of tetraethylorthosilicate (TEOS). After that, 39.97 g of a solution of 1,5-bis(methylpyrrolidinium)pentane dihydroxide $(R(OH)_2)$ containing 0.85 equivalents of hydroxide in 1000 g are added, and then 2.32 g of germanium oxide are dissolved. The mixture is left to evaporate with stirring until complete elimination of the ethanol deriving from the hydrolysis of the TEOS plus the necessary quantity of water in order to achieve the stated final composition. The composition of the gel is: 0.67 $SiO_2$:0.33 $GeO_2$:0.02 $TiO_2$:0.25 $R(OH)_2$:3.5$H_2O$.

The mixture obtained is introduced into an autoclave internally lined with polytetrafluoroethylene and is heated to 175° C. for 16 days.

The X-ray diffraction pattern of the solid obtained after filtering, washing with distilled water and drying at 100° C. indicates that it is ITQ-22.

Example 7

This example illustrates the synthesis of Sn-ITQ-22.

To 5.00 g of tetraethylorthosilicate (TEOS), 15.12 g of a solution of 1,5-bis(methylpyrrolidinium)pentane dihydroxide $(R(OH)_2)$ containing 1.20 equivalents of hydroxide in 1000 g are added, and then 1.26 g of germanium oxide are dissolved. After that a solution of 0.105 g of tin (IV) tetrachloride pentahydrate in 2 g of water is added. The mixture is left to evaporate with stirring until complete elimination of the ethanol deriving from the hydrolysis of the TEOS plus the necessary quantity of water in order to achieve the stated final composition. The composition of the gel is: 0.67 $SiO_2$:0.33 $GeO_2$:0.0083 $SnO_2$:0.25 $R(OH)_2$:3.5$H_2O$.

The mixture obtained is introduced into an autoclave internally lined with polytetrafluoroethylene and is heated to 175° C. for 23 days.

The X-ray diffraction pattern of the solid obtained after filtering, washing with distilled water and drying at 100° C. indicates that it is ITQ-22.

Example 8

This Example Illustrates the Preparation of a Component of the Catalytic Cracking Catalyst Containing Zeolite Type ITQ-22 Previously Activated in Order to Obtain the Acid Form at 580° C. in Air.

With the aim of studying the activity and selectivity of zeolite ITQ-22 in the catalytic cracking of industrial fractions of petroleum, a catalyst was prepared mixing ITQ-22 type zeolite, in its acid form, as was described in example 5 and a silica (BASF D1111), both in powder form and in a composition of 23% and 77% by weight of ITQ-22 type zeolite, and $SiO_2$, respectively. The mixture, thoroughly homogenised, was made into cake form, crushed in a mortar and sieved taking the fraction between 0.59 and 0.84 mm in diameter.

Example 9

This Example Illustrates the Preparation of a Component of the Catalytic Cracking Catalyst Containing Zeolite USY for Laboratory Test.

A catalyst was prepared mixing a zeolite USY (CBV760 from Zeolyst Intl.) and silica (BASF D1111), both in powder form and in a composition of 67% and 33% by weight of USY and $SiO_2$ respectively. The mixture, thoroughly homogenised, was made into cake form, crushed in a mortar and sieved taking the fraction between 0.59 and 0.84 mm in diameter.

Example 10

This Example Illustrates the Use of Zeolite ITQ-22 as Additive of the Catalytic Cracking Catalyst of a Vacuum Gasoil.

The catalytic components described in example 8 were used as additive of the catalytic component described in example 9 in the catalytic cracking of a vacuum gasoil whose characteristics are given in table V The catalysts are provided on two separate beds in the reactor as described in *Journal of Catalysis* 1997, 165 (1), p. 102. In the upper zone, 1.5 grams of catalyst of example 9 are placed, and in the lower zone 1.34 g of catalyst of example 8.

TABLE V

Properties of the vacuum gasoil

| | |
|---|---|
| Density (1° 5° C.) g cc$^{-1}$ | 0.9172 |
| Aniline point (° C.) | 79.2 |
| Sulphur (% by weight) | 1.65 |
| Nitrogen (ppm) | 1261 |
| Na (ppm) | 0.18 |
| Cu (ppm) | <0.1 |
| Fe (ppm) | 0.30 |
| Ni (ppm) | 0.2 |
| V (ppm) | 0.40 |
| ASTM D-1160 (° C.) | |
| 5% | 319 |
| 10% | 352 |
| 30% | 414 |
| 50% | 436 |
| 70% | 459 |
| 90% | 512 |
| VABP (° C.)[1] | 435 |
| K (UOP) | 11.82 |
| Average molecular weight | 407 |
| Aromatic carbon (% by weight) | 22.96 |
| Naphthenic carbon (% by weight) | 15.16 |
| Paraffinic carbon (% by weight) | 61.88 |

[1]VABP = volume average boiling point

The reaction conditions were 520° C., reaction time of 30 seconds, 2.34 grams of catalyst and catalyst/feed ratios by weight of 0.59, 0.73, 0.95, 1.35 and 2.38, the quantities of gasoil fed being 3.76, 3.07, 2.35, 1.65 and 0.94 grams. The gases produced were analysed by gas chromatography, the liquids by simulated distillation (ASTM D-2887) and the coke was measured by analysis (IR) of the $CO_2$ formed during the combustion. The conversion is defined as the sum of the yields of gases $H_2$ and $C_1$-$C_4$ coke and gasoline (boiling point <235.4° C.).

The composition (PIONA: Paraffins, Isoparaffins, Olefins and Aromatics) and quality (RON: Research Octane Number) of the gasoline fraction were determined by gas chromatography using the "detailed hydrocarbons analysis" computer program supplied by VARIAN and the correlations shown in the publication: Lugo, H. J., Ragone, G., and Zambrano, J., *Ind. Eng. Chem. Res.* 38, 2171 (1999). The results obtained by interpolation at 80% of total conversion are shown in table VI. The use of the zeolite ITQ-22 as additive of zeolite USY (USY/ITQ-22 Catalyst) increases the yield of olefins C3 and C4 with respect to the base catalyst (USY), with a slight drop in the yield of gasoline. Also, the gasoline obtained has a lower aromatics content when the catalyst contains the additive ITQ-22.

It is important to note that the propylene/propane ratio obtained is greater when ITQ-22 is used as additive, this result being highly beneficial from the point of view of a possible industrial process.

TABLE VI

Selectivities and ratios of interest in the catalytic cracking of gasoil at 520° C. and feed time of 30 s. Fresh additive.

| CATALYST | USY | USY/ITQ-22 |
|---|---|---|
| CAT/OIL (g/g) | 1.50 | 1.37 |
| CONVERSION % | 80 | 80 |
| GASOLINE % | 45.9 | 40.3 |
| GASES % | 28.1 | 33.0 |
| COKE % | 6.0 | 6.7 |
| C1-C4 fraction | | |
| HYDROGEN % | 0.12 | 0.10 |
| METHANE % | 0.88 | 0.88 |
| ETHANE % | 1.04 | 1.04 |
| ETHYLENE % | 1.99 | 2.21 |
| PROPANE % | 3.42 | 3.75 |
| PROPYLENE % | 5.18 | 7.09 |
| ISOBUTANE % | 8.89 | 9.25 |
| NBUTANE % | 2.23 | 2.41 |
| NBUTENES % | 3.28 | 4.07 |
| ISOBUTENE % | 1.08 | 2.22 |
| Ratios | | |
| BUTENE/BUTANE | 0.39 | 0.54 |
| PROPYLENE/PROPANE | 1.51 | 1.89 |
| ISOBUTANE/NBUTANE | 3.99 | 3.84 |
| $H_2$ + C1 + C2 | 3.92 | 4.14 |
| ISOBUTENE/NBUTENES | 0.33 | 0.55 |
| ISOBUTENE/ISOBUTANE | 0.12 | 0.24 |
| $H_2$ + C1 + C2/ISOBUTANE | 0.44 | 0.45 |
| C3/C4 | 0.56 | 0.60 |
| ISOBUTENE + ISOBUTANE/TOTAL C4 | 0.64 | 0.64 |
| ISOBUTANE/NBUTANE | 0.08 | 0.14 |
| $H_2$ + C1 + C2/ISOBUTENE + ISOBUTANE | 0.39 | 0.36 |
| ETHYLENE/ETHANE | 1.91 | 2.12 |
| ETHYLENE/PROPYLENE | 0.39 | 0.31 |
| Composition of the gasoline % by weight | | |
| AROMATICS % | 75.81 | 77.63 |
| ISOPARAFFINS % | 11.85 | 9.13 |
| NAPHTHENES % | 6.90 | 5.62 |
| OLEFINS % | 3.43 | 3.71 |
| PARAFFINS % | 2.02 | 3.91 |
| RON | 90.68 | 91.04 |
| MON | 86.31 | 86.80 |
| RON barrel | 41.6 | 36.7 |
| MON barrel | 39.6 | 35.0 |
| ISOAMYLENES % | 0.91 | 0.94 |

Example 11

The Present Example Illustrates the Use of a Material Prepared According to Example 5 and Activated by Calcination in Air at 580° C. for 3 Hours as a Catalyst in Alkylation of Benzene with Propylene.

An activated sample of the material prepared according to example 5 was made into cake form, selecting the particle size between 0.25 and 0.42 mm, in order to carry out the reaction. The zeolite (0.55 g) was diluted with silicon carbide (0.59-0.84 mm) in a ratio by weight of SiC/zeolite of 5. The diluted catalyst was introduced into a tubular steel reactor of diameter 1 cm and 100 mL.min$^{-1}$ of $N_2$ was passed under standard conditions at 150° C. for 1.5 hours. The temperature was then lowered to 20° C. and the $N_2$ stream was cut off. At this point, benzene was fed (1200 μL.min$^{-1}$) and the pressure was raised to 3.5 MPa. Once the pressure had reached 3.5 MPa, the temperature was raised to 125° C. and the propylene started to be fed (270 μL.min$^{-1}$), the molar ratio of benzene/propylene being 3.4.

The results of converted propylene are presented in Table VII.

TABLE VII

Conversion and selectivity in alkylation of benzene with propylene at 125° C., B/P = 3.4 mol.mol$^{-1}$, WHSV prop = 6 h$^{-1}$, P = 3.5 MPa for the catalyst Al-ITQ-22 prepared according to example 5.

| Reaction time (min) | Conversion (%) | Selectivity referred to propylene (%) | | | |
|---|---|---|---|---|---|
| | | Cumene | DIPB | NPB | Others |
| 15 | 95.62 | 93.09 | 6.70 | 0.04 | 0.17 |
| 60 | 98.02 | 93.01 | 6.73 | 0.05 | 0.22 |
| 100 | 97.23 | 93.89 | 5.75 | 0.03 | 0.33 |
| 140 | 96.30 | 95.83 | 3.83 | 0.03 | 0.31 |
| 180 | 97.94 | 95.55 | 4.27 | 0.03 | 0.15 |

In this example, very high values of selectivity to cumene can be seen along with very low values of NPB and diisopropylbenzene (DIPB), less than those obtained using zeolite Beta as catalysts under the same reaction conditions. The results obtained with a commercial zeolite Beta of Si/Al=13 supplied by Zeolyst (code CP811) are shown in Table VIII.

TABLE VIII

Conversion and selectivity in alkylation of benzene with propylene at 125° C., B/P = 3.4 mol.mol$^{-1}$, WHSV prop = 6 h$^{-1}$, P = 3.5 MPa for a commercial catalyst of zeolite Beta (Si/Al = 13).

| Reaction time (min) | Conversion (%) | Selectivity referred to propylene (%) | | | |
|---|---|---|---|---|---|
| | | Cumene | DIPB | NPB | Others |
| 20 | 98.07 | 91.35 | 8.45 | 0.04 | 0.16 |
| 90 | 97.36 | 92.41 | 7.35 | 0.05 | 0.19 |
| 160 | 98.54 | 90.84 | 8.85 | 0.05 | 0.26 |
| 210 | 99.65 | 93.28 | 6.49 | 0.05 | 0.18 |

From a comparison of the results presented in Tables VI and VIII, it can be seen that zeolite ITQ-22 displays greater selectivity to cumene and less to n-propylbenzene than zeolite Beta, which is the zeolitic catalyst currently most used for producing cumene.

Example 12

The present example shows the influence of the reaction temperature on the conversion and selectivity for alkylation of benzene with propylene using the same catalyst as in example 11, the rest of the reaction conditions being the same as in example 11.

The results of the conversion with the reaction time are presented in Table IX.

TABLE IX

Conversion and selectivity in alkylation of benzene with propylene at 150° C., B/P = 3.4 mol.mol$^{-1}$, WHSV prop = 6 h$^{-1}$, P = 3.5 MPa for the catalyst Al-ITQ-22 prepared according to example 5.

| Reaction time (min) | Conversion (%) | Selectivity referred to propylene (%) | | | |
|---|---|---|---|---|---|
| | | Cumene | DIPB | NPB | Others |
| 20 | 99.51 | 97.25 | 2.62 | 0.06 | 0.07 |
| 60 | 98.70 | 94.17 | 5.62 | 0.07 | 0.14 |
| 100 | 99.41 | 96.10 | 3.77 | 0.06 | 0.07 |
| 180 | 99.31 | 95.04 | 4.74 | 0.06 | 0.16 |

Example 13

The present example illustrates the use of a material prepared according to example 5 and activated by calcination in air at 580° C. for 3 hours as a catalyst in alkylation of benzene with ethylene.

An activated sample of the material prepared according to example 5 was made into cake form, selecting the particle size between 0.25 and 0.42 mm, in order to carry out the reaction. So, 0.55 g of the zeolite was diluted in 1.57 g of silicon carbide (0.59-0.84 mm). The diluted catalyst was introduced into a tubular steel reactor of diameter 1 cm. The activation of the catalyst was the same as in example 11. In the present example the reaction temperature was 220° C., with 2.90 mmoles of benzene and 0.30 mmoles of ethylene being fed, the pressure of the process being 3.5 MPa. The results obtained are presented in Table X.

TABLE X

Conversion and selectivity in alkylation of benzene with ethylene at 220° C., B/E = 9.6 mol.mol$^{-1}$, WHSV ethyl = 1.0 h$^{-1}$, P = 3.5 MPa for the catalyst Al-ITQ-22 prepared according to example 5.

| Reaction t (min) | Ethylene conversion (%) | Selectivity (%) | | | |
|---|---|---|---|---|---|
| | | Ethyl benzene | Butyl benzene | Diethyl benzene | Triethyl benzene |
| 30 | 99.40 | 98.20 | 0.09 | 1.71 | 0.00 |
| 120 | 99.20 | 98.10 | 0.10 | 1.80 | 0.00 |
| 210 | 99.10 | 97.47 | 0.16 | 2.37 | 0.00 |
| 300 | 99.18 | 98.54 | 0.09 | 1.36 | 0.01 |
| 420 | 99.52 | 97.67 | 0.12 | 2.19 | 0.02 |

Example 14

This example illustrates the use of a sample Ti-ITQ-22 prepared according to example 6 and activated by calcination in air at 580° C. for 3 hours, as a catalyst for the epoxidation reaction of 1-hexene with hydrogen peroxide.

1.420 grams of 1-hexene and 0.412 grams of hydrogen peroxide (35% in water) dissolved in 12.00 g of methanol are placed in a glass reactor. The reaction mixture is heated to 60° C. and 0.100 grams of activated catalyst Ti-ITQ-22 are added. After 3 hours of reaction at this temperature with stirring, a 15% conversion of olefin is obtained with respect to the maximum possible, bearing in mind the olefin/oxidising agent molar ratio used in this example.

Example 15

This example illustrates the use as a catalyst of a sample Ti-ITQ-22 prepared according to example 6 and activated by calcination in air at 580° C. for 3 hours for the epoxidation reaction of 1-dodecene with hydrogen peroxide.

2.780 grams of 1-dodecene and 0.440 grams of hydrogen peroxide (35% in water) dissolved in 60.00 g of methanol are placed in a glass reactor. The reaction mixture is heated to 60° C. and 0.100 grams of activated catalyst Ti-ITQ-22 are added. After 7 hours of reaction at this temperature with stirring, a 5% conversion of olefin is obtained with respect to the maximum possible, bearing in mind the olefin/oxidising agent molar ratio used in this example.

Example 16

This example illustrates the use of a sample Ti-ITQ-22 prepared according to example 6 and activated by calcination in air at 580° C. for 3 hours, as a catalyst for the epoxidation reaction of cyclohexene with terc-butyl-hydroperoxide.

9.270 grams of cyclohexane and 3.180 grams of terc-butyl-hydroperoxide are placed in a glass reactor. The reaction mixture is heated to 60° C. and 0.600 grams of activated catalyst Ti-ITQ-22 are added. After 5 hours of reaction at this temperature with stirring, a 4% conversion of olefin is obtained with respect to the maximum possible, bearing in mind the olefin/oxidising agent molar ratio used in this example.

Example 17

This example illustrates the use as a catalyst of a sample Sn-ITQ-22 prepared according to example 7 and activated by calcination in air at 580° C. for 3 hours in the Baeyer-Villiger reaction between cyclohexanone and hydrogen peroxide.

0.063 grams of cyclohexanone and 0.078 grams of hydrogen peroxide (35% in water) dissolved in 1.520 g of dioxane are placed in a glass reactor. The reaction mixture is heated to 70° C. and 0.025 grams of activated catalyst Sn-ITQ-22 are added. After 7 hours of reaction at this temperature with stirring, a 47% conversion of ketone is obtained with respect to the maximum possible, bearing in mind the ketone/oxidising agent molar ratio used in this example.

Example 18

This example illustrates the use as a catalyst of a sample Sn-ITQ-22 prepared according to example 7 and activated by calcination in air at 580° C. for 3 hours for the Baeyer-Villiger reaction between adamantanone and hydrogen peroxide.

0.250 grams of adamantanone and 0.259 grams of hydrogen peroxide (35% in water), dissolved in 1.530 g of dioxane, are placed in a glass reactor. The reaction mixture is heated to 90° C. and 0.025 grams of activated catalyst Sn-ITQ-22 are added. After 7 hours of reaction at this temperature with stirring, a 22% conversion of ketone is obtained with respect to the maximum possible, bearing in mind the ketone/oxidising agent molar ratio used in this example.

What is claimed is:

1. A microporous crystalline material of zeolitic nature which, in the calcined state and in the absence of defects in its crystal lattice manifested by the presence of silanols, has the empirical formula $x(M_1/nXO_2):yYO_2:zGeO_2:(1-z)SiO_2$ in which: M is H+ or at least one inorganic cation of charge +n; X is at least one chemical element of oxidation state +3, preferably selected from the group consisting of Al, Ga, B, Fe and Cr; Y is at least one chemical element with oxidation state +4 other than Si and Ge, preferably selected from the group consisting of Ti, Sn and V, wherein x has a value less than 0.2, preferably less than 0.1 and can take the value zero, y has a value less than 0.1, preferably less than 0.05 and can take the value zero, z has a value less than 0.8, preferably between 0.005 and 0.5 and can take the value zero, and wherein the material, as synthesised, has an X-ray diffraction pattern with values of angle 2θ (degrees) and relative intensities ($I/I_0$) concordant with

| 2θ (degrees) ± 0.5 | Intensity ($I/I_0$) |
|---|---|
| 8.02 | vs |
| 8.43 | vs |
| 9.31 | m |
| 10.64 | vs |

-continued

| 2θ (degrees) ± 0.5 | Intensity ($I/I_0$) |
|---|---|
| 20.26 | m |
| 21.81 | s |
| 22.53 | vs | where m is a medium relative intensity between 20 and 40%; s is a strong relative intensity between 40 and 60%, and vs is a very strong relative intensity between 60 and 100%.

2. A microporous crystalline material of zeolitic nature according to claim 1, wherein, in the calcined state, it has an X-ray diffraction pattern with values of angle 2θ (degrees) and relative intensities ($I/I_0$) concordant with

| 2θ (degrees) ± 0.5 | Intensity ($I/I_0$) |
|---|---|
| 6.97 | m |
| 8.00 | vs |
| 8.40 | vs |
| 9.28 | m |
| 10.62 | vs |
| 20.18 | m |
| 21.74 | m |
| 22.54 | vs | where m is a medium relative intensity between 20 and 40%; s is a strong relative intensity between 40 and 60%, and vs is a very strong relative intensity between 60 and 100%.

3. A method for synthesising the microporous crystalline material of claim 1 in which a reaction mixture containing a source of $SiO_2$, optionally a source of $GeO_2$, optionally a source of other tetravalent element or elements Y, preferably Ti, V, Sn, optionally a source of other trivalent element or elements X, preferably Al, B, Ga, Fe, Cr, optionally a source of inorganic cations M of charge +n, one or several sources of organic cation R, preferably 1,5-bis (methylpyrrolidinium) pentane, and water, is subjected to heating with or without stirring at a temperature between 80 and 200° C., preferably between 130 and 2000° C., until achieving crystallisation, wherein the reaction mixture has a composition in terms of molar ratios of oxides lying in the ranges $ROH/SiO_2$=0.01-1.0, preferably 0.1-1.0 $M_1/nOH/SiO_2$=0-1.0, preferably 0-0.2 $X_2O_3/SiO_2$=0-0.1, preferably 0-0.05 $YO_2/SiO_2$=0-0.1, preferably 0-0.05 $GeO_2/SiO_2$=0-4, preferably 0.005-1 $H_2O/SiO_2$=1-100, preferably 1-50.

4. A method according to claim 3, wherein the organic cation 1,5-bis(methylpyrrolidinium)pentane is added in dihydroxide form or in the form of a mixture of hydroxide and another salt, preferably a halide.

5. A method according to claim 4, wherein a quantity of crystalline material is added to the reaction mixture, preferably with the characteristics of aid microporous crystalline material of zeolite nature, as promoter of the crystallisation, said quantity lying in the range 0.01 to 20% by weight with respect to the total of inorganic oxides added, preferably between 0.05 and 10%.

6. A method using a catalyst, wherein a microporous crystalline material of claim 1 is a component of the catalyst, selected from the group consisting of cracking, hydrocracking, gentle hydrocracking of hydrocarbons and/or functionalised hydrocarbons, a process of isomerisation of light paraffins, a process of deparaffining or isodeparaffining, a process of alkylation of isoparaffins with olefins, a process of alkylation of aromatics and aromatics substituted with olefins, alcohols, polyalkylated aromatics or mixtures thereof, an acylation process, and an oxidation process.

7. A method according to claim 6 in a catalytic cracking process of organic compounds wherein the catalyst includes zeolite ITQ-22 as sole zeolitic component embedded in a matrix, or zeolite ITQ-22 material together with at least one second zeolitic component embedded in a matrix.

8. A method according to claim 7 wherein the said at least one second zeolitic component is formed by zeolitic structures containing pores delimited by rings of 14 members, by rings of 12 members, by rings of 11 members, by rings of 10 members and mixtures thereof.

9. A method according to claim 7, wherein at least part of the catalyst particles comprise a second zeolitic component selected among one or more of the group comprising zeolite faujasite Y, ZSM-5 and Beta.

10. A method according to claim 7, wherein said catalyst is partially or wholly constituted by a single type of particle with the zeolite ITQ-22 material and said at least one second zeolitic component being present in the same particle.

11. A method according to claim 10, wherein the said second zeolitic component is zeolite faujasite Y under the form of one or more of its variants selected from the group consisting of zeolite faujasite Y, ultrastable zeolite faujasite Y, zeolite faujasite Y fully exchanged with rare earths, zeolite faujasite Y partially exchanged with rare earths, ultrastable zeolite faujasite Y fully exchanged with rare earths, ultrastable zeolite faujasite Y partially exchanged with rare earths and mixtures thereof, zeolite ITQ-22 being present in quantities between 0.1 and 60% by weight with respect to the total of zeolitic components, and zeolite faujasite Y in a quantity between 0.1 and 99.9% by weight with respect to the total of zeolitic components, the rest of the composition of the catalyst up to 100% being formed by the matrix.

12. A method according to claim 11, wherein at least part of the particles of the catalyst comprise: 0.1-40% by weight of the zeolitic material ITQ-22 with respect to the total weight of zeolitic components, and 0.1-99.9% by weight of the zeolite faujasite Y with respect to the total weight of zeolitic components.

13. A method according to claim 7, wherein said catalyst consists partially or wholly of at least two types of particle, with ITQ-22 and said at least one second zeolitic component being present in different particles.

14. A method according to claim 13, wherein the catalytic cracking catalyst comprises: 0.1-40% by weight of particles containing zeolite ITQ-22 with respect to the sum of zeolitic components, wherein each particle comprises 10-70% by weight of zeolite ITQ-22; 0.1-99.9% by weight of particles of conventional catalytic cracking catalyst based on zeolite faujasite Y, wherein the percentages are indicated with respect to the sum of zeolitic components.

15. A method according to claim 13, wherein said catalytic cracking catalyst in addition comprises particles containing zeolite ZSM-5, the composition of the catalyst being: zeolite faujasite Y in a quantity of at least 20% by weight with respect to the total weight of zeolitic components, quantity of zeolite ITQ-22+ZSM-5 is a maximum of 80% by weight, with respect to the total weight of zeolitic components, and the ratio by weight between zeolite ZSM-5 and zeolite ITQ-22 lies between 10 and 0.

16. A method according to claim 7, wherein the matrix contains at least one binder selected among silica, silica-alumina, alumina, $P_2O_5$ and combinations thereof, and optionally also a conventional additive for catalytic cracking.

17. A method according to claim 7, wherein any of the zeolitic components also contain a maximum of 8% by weight of phosphorus.

18. A method according to claim 7, wherein any of the zeolitic components are exchanged with ions selected among divalent ions, trivalent ions, divalent and trivalent ions, and rare earths.

19. A method according to claim 7, wherein any of the zeolitic components comprise compounds of vanadium introduced in a post-synthesis stage.

20. A method according to claim 7, wherein any of the zeolitic components comprise cerium introduced in a post-synthesis stage.

21. A method according to claim 7, wherein the catalyst is formed of particles with a size between 20 and 400 micrometers.

22. A method according to claim 7, wherein the catalytic process is selected between a catalytic cracking process in fluid bed (FCC) and a deep catalytic cracking (DCC) process.

23. A method according to claim 6, wherein the organic compounds are hydrocarbons derived from fractions of natural or synthetic petroleum.

24. A method according to claim 6 in a process for the alkylation of aromatic compounds, wherein an alkylating agent selected among an alcohol, an olefin, a polyalkylated aromatic compound and mixtures thereof is made to react under alkylation conditions with a starting aromatic compound in the presence of a catalyst, said catalyst being ITQ-22.

25. A method according to claim 24, wherein the starting aromatic compound is selected from the group consisting of benzene, naphthalene, anthracene, phenanthrene and substituted derivatives thereof.

26. A method according to claim 24, wherein the starting aromatic compound is selected among alkylbenzene, alkylanthracene, alkylphenanthrene, hydroxybenzene, hydroxynaphthalene, hydroxyanthracene, hydroxyphenanthrene, alcoxybenzene, alcoxynaphthalene, alcoxyanthracene and alcoxyphenanthrene.

27. A method according to claim 26, wherein the alkylating agent is a polyalkylated aromatic compound, the starting aromatic compound is a non-alkylated aromatic compound, and in which during the alkylation at least one alkyl group is transferred from the polyalkylated aromatic compound to the starting aromatic compound.

28. A method according to claim 27 wherein said polyalkylated aromatic compound contains at least one alkyl group which comprises from 2 up to 20 carbon atoms.

29. A method according to claim 27 wherein the starting aromatic compound is selected among benzene, naphthalene, anthracene, phenanthrene, substituted benzene, substituted naphthalene, substituted anthracene and substituted phenanthrene.

30. A method according to claim 27 wherein the polyalkylated aromatic compound is polyisopropylbenzene and the starting aromatic compound is benzene.

31. A method according to claim 24, wherein the alkylating agent is selected among an olefin, an alcohol and mixtures thereof and said olefin and said alcohol contain from 2 to 20 carbon atoms.

32. A method according to claim 24, wherein the starting aromatic compound is benzene, the alkylating agent is propylene and in which the alkylation procedure produces cumene as alkylated aromatic compound.

33. A method according to claim 24, wherein the alkylation reaction is conducted at a reaction temperature of between 60 and 350° C.

34. A method according to claim 24, wherein the alkylation reaction is conducted at a pressure between 1.4 and 7.0 MPa.

35. A method according to claim 24, wherein the alkylating agent and the starting aromatic compound are present in a proportion of between 2 and 20, in the presence of the catalyst.

36. A method according to claim 24, wherein the starting aromatic compound is benzene and the alkylating agent is propylene and the alkylated aromatic compound that is obtained is cumene; the alkylation reaction is carried out at a reaction temperature between 60 and 350° C.; the pressure at which the alkylation reaction is carried out lies between 1.4 and 7.0 MPa; the spatial velocity (WHSV) of reagents lies between 0.2 and 10 hours$^{-1}$ and the benzene/propylene molar ratio is between 2 and 20.

37. A method according to claim 6, wherein the material contains Ti and is used as a catalyst in a process selected among selective oxidation processes of organic compounds using an oxidising agent selected among $H_2O_2$ or peroxides, hydroperoxides or organic peracids.

38. A method according to claim 6, wherein the material contains Sn and is used as a catalyst in a process selected among oxidation processes of the Baeyer-Villiger type.

39. A method according to claim 6, wherein the material is used as a catalyst in a process selected among oxidation processes of the Meerwein-Pondorf-Verley type.

40. A method according to claim 6, wherein the material is used as a catalyst in a process selected among hydroisomerisation processes of olefins, alkylation of olefins with isoparaffins and alkylation of aromatics with olefins or alcohols.

* * * * *